US009875528B2

(12) United States Patent
Jin et al.

(10) Patent No.: US 9,875,528 B2
(45) Date of Patent: Jan. 23, 2018

(54) MULTI-FRAME PATCH CORRESPONDENCE IDENTIFICATION IN VIDEO

(71) Applicant: Adobe Systems Incorporated, San Jose, CA (US)

(72) Inventors: Hailin Jin, San Jose, CA (US); Scott David Cohen, Sunnyvale, CA (US); Zhe Lin, Fremont, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 453 days.

(21) Appl. No.: 13/904,903

(22) Filed: May 29, 2013

(65) Prior Publication Data

US 2014/0355959 A1 Dec. 4, 2014

(51) Int. Cl.
*H04N 9/88* (2006.01)
*H04N 5/14* (2006.01)
(Continued)

(52) U.S. Cl.
CPC .............. *G06T 5/002* (2013.01); *G06T 5/003* (2013.01); *G06T 5/009* (2013.01); *G06T 7/20* (2013.01); *G06T 7/248* (2017.01); *G06T 2207/10016* (2013.01); *G11B 27/031* (2013.01); *H04N 19/51* (2014.11)

(58) Field of Classification Search
CPC ........ G11B 27/031; G06T 2207/10016; G06T 5/002; G06T 5/003; G06T 5/009; G06T 7/204; G06T 7/20; G06T 7/2053; H04N 7/52; H04N 7/014; H04N 5/23254;
(Continued)

(56) References Cited

U.S. PATENT DOCUMENTS 5,469,536 A * 11/1995 Blank .................. H04N 1/3873
345/594
8,670,483 B2 * 3/2014 Morphet ............... G06T 7/2013
375/240.16
(Continued)

OTHER PUBLICATIONS

"Liu, Ce, et al, "A high-quality video denoising algorithm based on reliable motion estimation", Proceeding: ECCV'10 Proceedings of the 11th European conference on computer vision conference on Computer vision: Part III, (2010), 706-719" provided by Applicant in IDS as prior art.*

(Continued)

*Primary Examiner* — Thai Tran
*Assistant Examiner* — Syed Hasan
(74) *Attorney, Agent, or Firm* — Shook, Hardy & Bacon L.L.P.

(57) ABSTRACT

A method and systems of identifying one or more patches in three or more frames in a video are provided. A region in a reference frame of the video may be detected. A set of regions in a prior frame and subsequent frame that are similar to the region in the reference frame may then be identified. Temporal consistency between the region in the reference frame and two or more regions in the set of regions in the prior and subsequent frames may then be calculated. Patches of regions in the first, reference, and third frames may be identified based at least in part on the calculated temporal consistencies, with each patch identifying a region in the reference frame that can be mapped to a similar region in the prior and subsequent frames.

18 Claims, 6 Drawing Sheets

(51) Int. Cl.
*H04N 11/02* (2006.01)
*G09G 5/02* (2006.01)
*G06K 9/00* (2006.01)
*G06K 9/32* (2006.01)
*G06K 9/40* (2006.01)
*G06T 5/00* (2006.01)
*G06T 7/20* (2017.01)
*G06T 7/246* (2017.01)
*G11B 27/031* (2006.01)
*H04N 19/51* (2014.01)

(58) Field of Classification Search
CPC .... H04N 1/4092; H04N 19/51; H04N 19/513; G06F 17/30265
USPC ............. 386/278; 345/594; 348/241, 699; 375/240.03, 240.16, 240.17; 382/103, 382/266, 299, 233, 224
See application file for complete search history.

(56) References Cited

U.S. PATENT DOCUMENTS

| | | | | |
|---|---|---|---|---|
| 2002/0114532 | A1* | 8/2002 | Ratner | G06T 9/00 382/266 |
| 2004/0218834 | A1* | 11/2004 | Bishop | H04N 19/587 382/299 |
| 2004/0234136 | A1* | 11/2004 | Zhu | G06K 9/3241 382/224 |
| 2006/0126952 | A1* | 6/2006 | Suzuki | G06T 5/002 382/233 |
| 2006/0140268 | A1* | 6/2006 | Ha | H04N 19/86 375/240.03 |
| 2009/0238406 | A1* | 9/2009 | Huang | G06F 17/5009 382/103 |
| 2012/0075535 | A1* | 3/2012 | Van Beek | H04N 5/145 348/699 |
| 2012/0236184 | A1* | 9/2012 | Jia | G06T 5/005 348/241 |

OTHER PUBLICATIONS

"He, K., et al., "Computing Nearest-Neighbor Fields via Progation-Assisted KD-Trees", CVPR 2012, (2012), 1-8" provided by Applicant in IDS as prior art.*

Barnes, Connelly, et al., "PatchMatch: a randomized correspondence algorithm for structural image editing", ACM Trans. Graph., 28(3), (Aug. 2009), 1-11.

Bhat, Pravin, et al., "Using photographs to enhance videos of a static scene", Proceeding: EGSR'07 Proceedings of the 18th Eurographics conference on Rendering Techniques, (2007), 327-333.

Gould, Stephen, et al., "PatchMatchGraph: Building a Graph of Dense Patch Correspondences for Label Transfer", Computer Vision—ECCV 2012, Lecture Notes in Computer Science, vol. 7576, (2012), 439-452.

He, K., et al., "Computing Nearest-Neighbor Fields via Propagation-Assisted KD-Trees", CVPR 2012, (2012), 1-8.

Liu, Ce, et al., "A high-quality video denoising algorithn based on reliable motion estimation", Proceeding: ECCV'10 Proceedings of the 11th European conference on computer vision conference on Computer vision: Part III, (2010), 706-719.

* cited by examiner

MULTI-FRAME PATCH CORRESPONDENCE IDENTIFICATION IN VIDEO

FIELD

The present disclosure relates generally to enhancement of video using related images.

BACKGROUND

There are a number of different enhancements that would be desirable to be performed on video. A number of these enhancements, however, would require manual editing techniques beyond the skill of a user. For example, a user may take a video of his or her spouse on the beach, and may wish to edit out one or more strangers walking into the frame. Currently this requires significant artistic and computing skill, as well as time, on the part of the user to select the portions of each frame of the video to remove, remove those selected sections, and blend the background images to fill in the removed sections to create a seamless look. Since there may be many frames in each second of video, this may result in the need to edit many different frames. It would be beneficial if there were a way to automate this process in an efficient manner.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
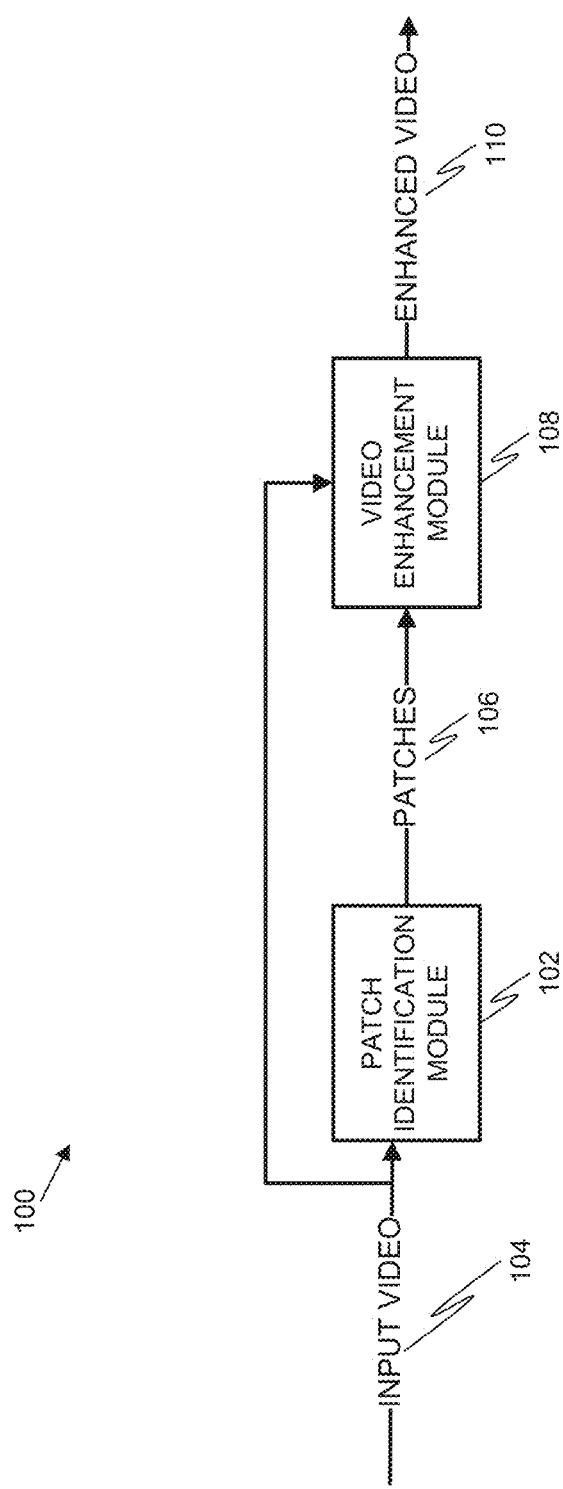
FIG. 1 is block diagram illustrating a system, in accordance with an example embodiment, of enhancing video.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Disclosed herein are example methods and systems of enhancing video. This may be accomplished via a number of different mechanisms. In an example embodiment, three or more frames of a video are analyzed to identify portions of the image, referred to herein by way of example as "patches," which represent a suspected object or portion of an object that is present in each of the frames, albeit in potentially different locations in each frame. This may be referred to as optical flow analysis. This analysis may involve examining colors, textures, and other features of a patch in one frame and identifying similar colors, textures, and other features in other frames. Additionally, the motion of a patch between frames may be analyzed, using temporal consistency as a constraint when identifying patches in frames.

For purposes of this disclosure, the three frames selected for analysis may be referred to as a reference frame, a prior frame, and a subsequent frame. A reference frame can be any frame in a video. A prior frame refers to any frame in the video that is earlier in the video than the reference frame (e.g., it need not be the immediately preceding frame). A subsequent frame refers to any frame in the video that is later in the video than the reference frame (e.g., it need not be in the immediately succeeding frame). In some embodiments, the selection of frames is such that the number of frames between the prior frame and the reference frame is equal to the number of frames between the reference frame and the subsequent frame.

Temporal consistency refers to the degree of consistency of the relative change in position of an object or region between frames over similar periods of time. For example, if an object moves a distance of 10 pixels between a prior frame and a subsequent frame and moves a distance of 10 pixels between the reference frame and a subsequent frame, then there would be a high degree of temporal consistency for the object. If, on the other hand, the object moved a distance of 10 pixels between a prior frame and a reference frame, and 100 pixels between the reference frame and a subsequent frame, then there would be a low degree of temporal consistency for the object.

Thus, a particular patch may be identified as a single object in the three or more frames not just by locating areas of the frames that contain similar colors, textures, and other features of the patch but also by ensuring that the change in position of the suspected similar areas between the prior and reference frames is consistent with the change in position of the suspected similar areas between the reference and subsequent frame. This may aid in reducing the possibility of false positives (e.g., an object in a subsequent frame erroneously being identified as the same object as an object in an earlier frame), without requiring increased computational resources.

The identified patches may then be used to perform any number of video enhancement functions on the video, including, for example, denoising, super-resolution, interpolation, deblurring, recoloring, contrast enhancement, compression removal, inpainting, and so forth.

For values of data such as images and/or videos, any of multiple representations or spaces can be used. In some example embodiments, images/videos can be represented as grayscale values, binary values, RGB/Lab/YIQ/YUB or any other color space, gradients, texture filters, wavelets, or any other filter responses, optical flow (for video), surface normal (for shapes), volume occupancy (for shapes), local histogram of quantized gradient orientations, local histogram of texture filters (e.g., textons), and any other image/video/rasterized shape representation or any combination of these, to name just a few examples. In some implementations, gradient domain reconstruction can be used. For example, the gradients and the colors can be reconstructed separately, and standard gradient domain techniques (e.g., solving the constrained Posson equation) can be used to reconstruct the image from its gradients, where the colors are used as a regularization term and/or initialization and/or boundary conditions.

It should also be noted that while the present disclosure discusses aspects in terms of two-dimensional images, similar techniques are used in other example embodiments for 3D shapes/models in, for example, a rasterized presentation. In such example embodiments, patches can be 3D. The search space can be 3D. In some example embodiments, an arbitrary dimensional Euclidean space can be used (e.g., 1D for curves, or 4D for voxel data changing in time). In some example embodiments, an arbitrary dimensional topological space may be used (e.g., a 2D coordinate system defined on the surface of a 3D donut or sphere).

FIG. 1 is block diagram illustrating a system 100, in accordance with an example embodiment, of enhancing video. The system 100 may be implemented on any number of different hardware components. In an example embodiment, the system 100 is implemented on a computer system executed by a processor. In another example embodiment, the system 100 may be executed using a graphics processing unit (GPU).

In some embodiments, the system 100 may reside on a user machine, such as a personal computer (PC), tablet computer, smartphone, and the like. In other embodiments, the system 100 may reside on a centralized server in communication with a user machine. In such embodiments, the user machine may direct the centralized server to perform the patch identification and/or video enhancement. It should be noted that hybrid embodiments are also envisioned, where some aspects of the patch identification and/or video enhancement are performed on a user machine and others are performed on a centralized server. This allows a user machine to offload part or all of the patch identification and/or video enhancement to another machine for faster processing.

The system 100 may include a patch identification module 102, which may act to identify patches in an input video 104. A patch may be defined as an image region believed to be mappable in multiple places in an input video or image. A patch may identify, for example, a region that closely resembles another region of the same image. Alternatively, the patch may identify a region that closely resembles another region of a different image in the same video. This patch identification can be performed in a number of different ways, although one specific example implementation will be described in more detail below. The output of the patch identification module 102 is one or more identified patches 106 from the input video 104. These patches 106 may then be passed to a video enhancement module 108, which may act to enhance the input video 104 based on the identified patches 106. The output of the video enhancement module 108 is an enhanced video 110.

Figure 2:
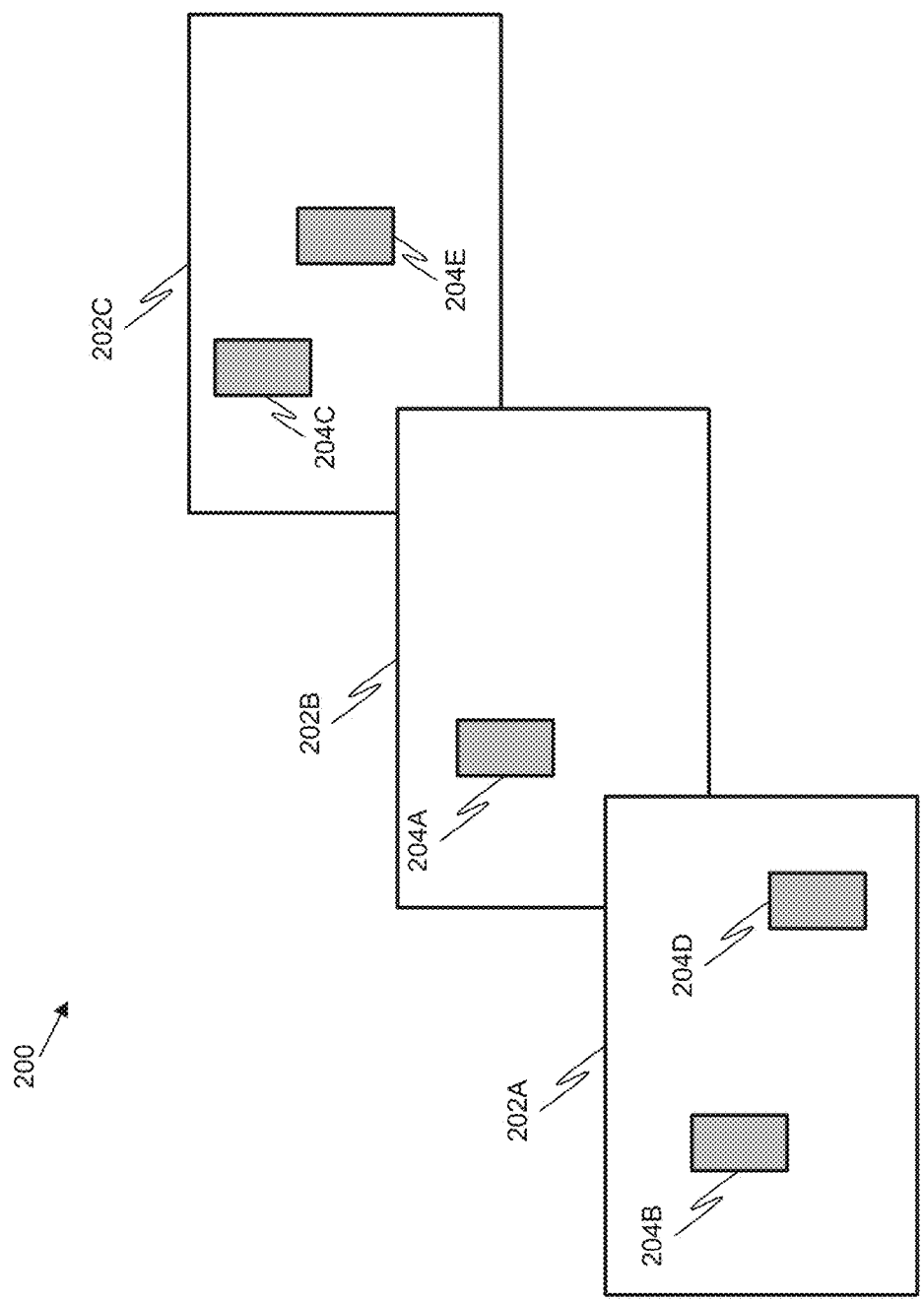
FIG. 2 is a diagram illustrating a method, in accordance with an example embodiment, of identifying patches in a video.

FIG. 2 is a diagram illustrating a method 200, in accordance with an example embodiment, of identifying patches in a video. The method 200 may be deployed on the system 100 and, accordingly, is described merely by way of example with reference thereto.

The method 200 depicts how three frames 202A, 202B, 202C of a video are analyzed to identify whether a suspected patch, such as suspected patch 204A, can be mapped to other suspected patches 204B, 204C, 204D, 204E in other frames. As described above, the purpose of this method 200 is to ensure that a portion of an image, such as an object, can be mapped through multiple frames of the video, despite the movement of the portion of the image between frames. Movement indicates the amount of change in position between frames. It should be noted, however, that the frames being referenced need not be adjacent frames in the video (e.g., it is possible that object position could be measured every 2 or more frames).

Here, suspected patch 204A is being examined, and various suspected patches 204B, 204C, 204D, 204E in the frames 202A, 202B, 202C are found to be substantially similar (for example, similar patterns, colors, textures, etc.). As will be described in more detail later, the suspected patch 204A could be selected in a number of different ways, including randomly or through the use of a KD-tree. The various suspected patches 204A, 204B, 204C, 204D, 204E may be analyzed using a nearest neighbor algorithm. In an example embodiment, an algorithm is used that examines all three frames 202A, 202B, 202C attempting to find the nearest suspected patches throughout all three frames 202A, 202B, 202C, as well as utilizing a temporal consistency component that factors in the change in positions from frame to frame. This algorithm may be expressed as follows:

$$\arg\min\_\{x_l, x_r\} |I_l(x_l) - I(x)| + |I_r(x_r) - I(x)| + \alpha |I_l(x_l) - I_r(x_r)| + \beta \text{dist}(x_l - x, x_r - x)$$

where x is the location of a patch in image I, $I_l$ and $I_r$ and are the images before and after I, respectively, and $\alpha$ and $\beta$ are constants, which may be weights assigned to the calculations in order to alter the importance of closeness in distance between suspected patches in frame 202A and frame 202C (which may be less important than, for example, the closeness in distance between suspected patches between frame 202A and frame 202B, and the closeness in distance between suspected patches in frame 202B and 202C). The weights may also alter the importance of temporal consistency between the suspected patches.

The weights may be either fixed or modifiable. In some example embodiments, the weights may be dynamically modifiable based on the type of the image and the type of video enhancement desired. For example, the weights assigned for a 16-bit color video to perform demising may be different than assigned for a black and white video to perform inpainting. In some example embodiments, the weights may be altered by the user, allowing the user flexibility in fine-tuning the system. Sliders, for example, may be presented in a user interface allowing the user to easily emphasize or deemphasize portions of the equation.

In an example embodiment, a may be a number less than 1.

The equation presented is merely one example embodiment. In other embodiments, other weights may be applied to some, all, or none of the variables and terms in the equation.

In an example embodiment, the analysis essentially finds, for a given optical path, what is the closest matching patch in another image. It does this by finding consistent offsets between patches.

Here, the analysis may find that suspected patches 204A, 204B, and 204C all comprise a single patch, by virtue of the fact that suspected patch 204B and suspected patch 204C both resemble suspected patch 204A and have temporal consistency. This is in contrast to, for example, suspected patch 204E, which, while resembling suspected patch 204A, does not have temporal consistency throughout the three frames 202A, 202B, 202C.

In another example embodiment, a constraint may be added to limit the maximum offset allowed. As an example, the constraint may indicate that if there is movement across more than half of the screen from frame to frame, the suspected patch will not be considered. Likewise, in another example embodiment, a constraint may be added to require a minimum offset. These constraints may be set by the system, a system administrator, or a user.

In the example depicted in FIG. 2, the algorithm identifies patches 204B and 204C as being the nearest neighbors in the neighboring frames 202A, 202C, thus identifying them as matching patches for patch 204A. Likewise, patches 204D and 204E would be found not to be matching patches for patch 204A, due, at least in part, to the fact that the change in the positions from frame to frame is not consistent.

It should be noted that while the above equation is described in teens of the examination of three frames, the equation can be modified to accommodate more frames, which may result in more accurate analysis in certain embodiments. For example, four (or more) frames may be examined using a modified equation that takes into account the potential patches from the fourth frame as well as the temporal consistency throughout the four frames.

Figure 3:
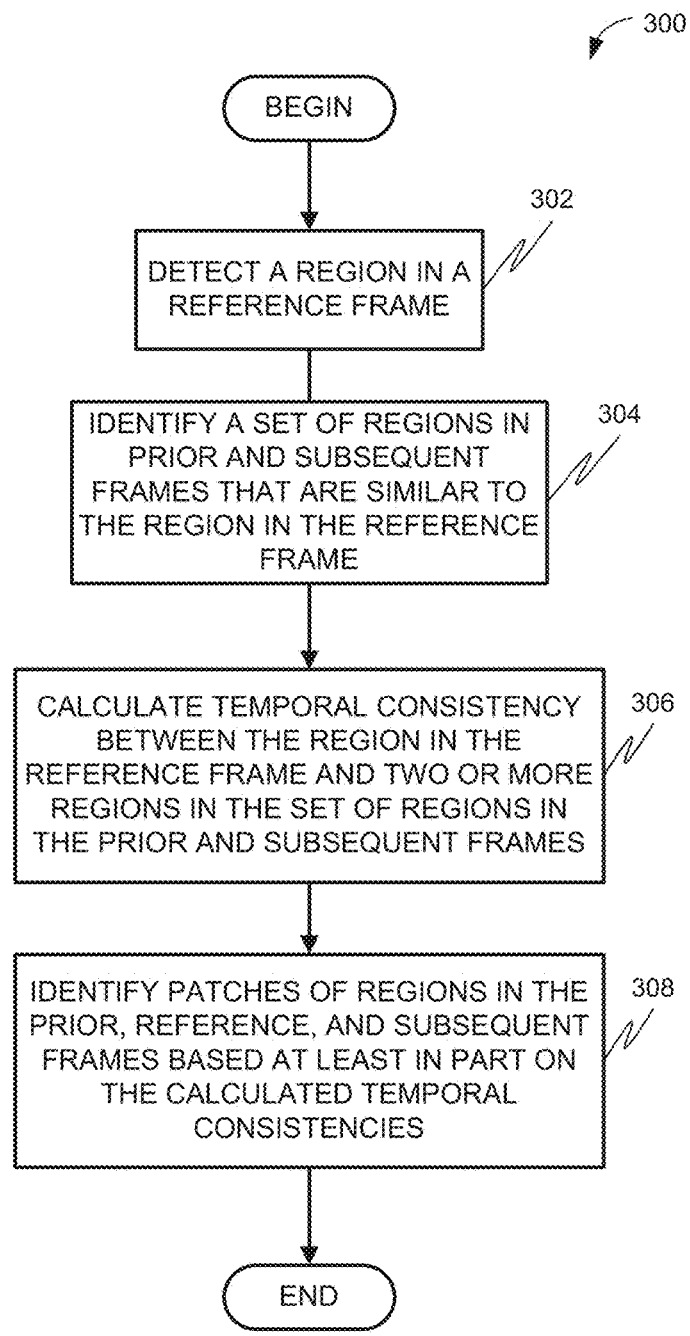
FIG. 3 is a flow diagram illustrating a method, in accordance with an example embodiment, of identifying one or more patches in three or more frames in a video.

FIG. 3 is a flow diagram illustrating a method 300, in accordance with an example embodiment, of identifying one or more patches in three or more frames in a video. Each of the patches represents a region that can be mapped throughout all of the three or more frames in the video. At operation 302, a region is detected in a reference frame. This is a region in the reference frame (e.g., middle frame) that is attempted to be found in in the prior and subsequent frames. At operation 304, a set of regions in a prior and subsequent frames that are similar to the region in the reference frame are identified. This may include at least one similar region in the prior frame and one similar region in the subsequent frame, although there may be any number of potential matches in each of the prior and subsequent frames.

At operation 306, temporal consistency between the region in the reference frame and two or more regions in the set of regions in the prior and subsequent frames may be calculated. At operation 308, patches of regions in the prior, reference, and subsequent frames may be identified based at least in part on the calculated temporal consistencies, with each patch identifying a region in the reference frame that can be mapped to a similar region in the prior and subsequent frames.

While FIG. 3 describes a process undertaken to determine whether a given region can be considered a patch with respect to other regions in other frames in the video, in this example embodiment it does not specify how the original region to be analyzed is selected, nor does it specify how the regions in the other frames to be compared with the original region are selected. In an example embodiment, the selection of the original region may be specified by a user (e.g., using a graphical user interface). For example, a user may use an input device to draw a selection box window around a particular region. The selection of which regions in the other frames to compare with this selected region may be random (e.g., the system may try multiple different random regions to find the ones that most closely resemble the selected region).

In another example embodiment, the selection of the original region may be random. For example, the system may simply analyze a number of different random regions against random regions in other frames.

In another example embodiment, KD-trees are used to aid in the selection of regions to analyze. In this embodiment, two KD-trees are built, for a prior frame and a subsequent frame, respectively, and an additional propagation cue using the temporal consistency is added in order to search the two trees jointly. As such, a number of candidates can be collected via this search. After all the candidates are collected, additional constraints could be enforced.

A KD-tree is a data structure used for efficient approximate nearest-neighbor field computation. Candidate patches are stored in a KD-tree, and each query can result in checking a leaf. A propagation-assisted KD-tree is a KD-tree where, during the query checking, an extra leaf propagated from nearby queries may also be checked. By reducing the number of candidates to check for each query, a propagation-assisted KB-tree performs queries very quickly and efficiently.

A typical KD-tree is a binary tree where each node denotes a subset of the candidate data with a portioning boundary of data space. The partitioning is adaptive to the distribution of the data. Given a query, the search methods descend the tree to a leaf and backtrack other leaves that are close to the query. A propagation-assisted KB-tree eliminates the need for backtracking using the propagated leafs.

There may be a variety of ways to build a KD-tree. In one example embodiment, a p-by-p patch in a color image can be represented by a vector in a $3p^2$-dimensional space. The similarity between two patches is described by the $L_2$ distance in this space. A Walsh-Hadamard. Transform may be used as the basis for the projection of each patch. It is a Fourier-like orthogonal transform.

Figure 4:
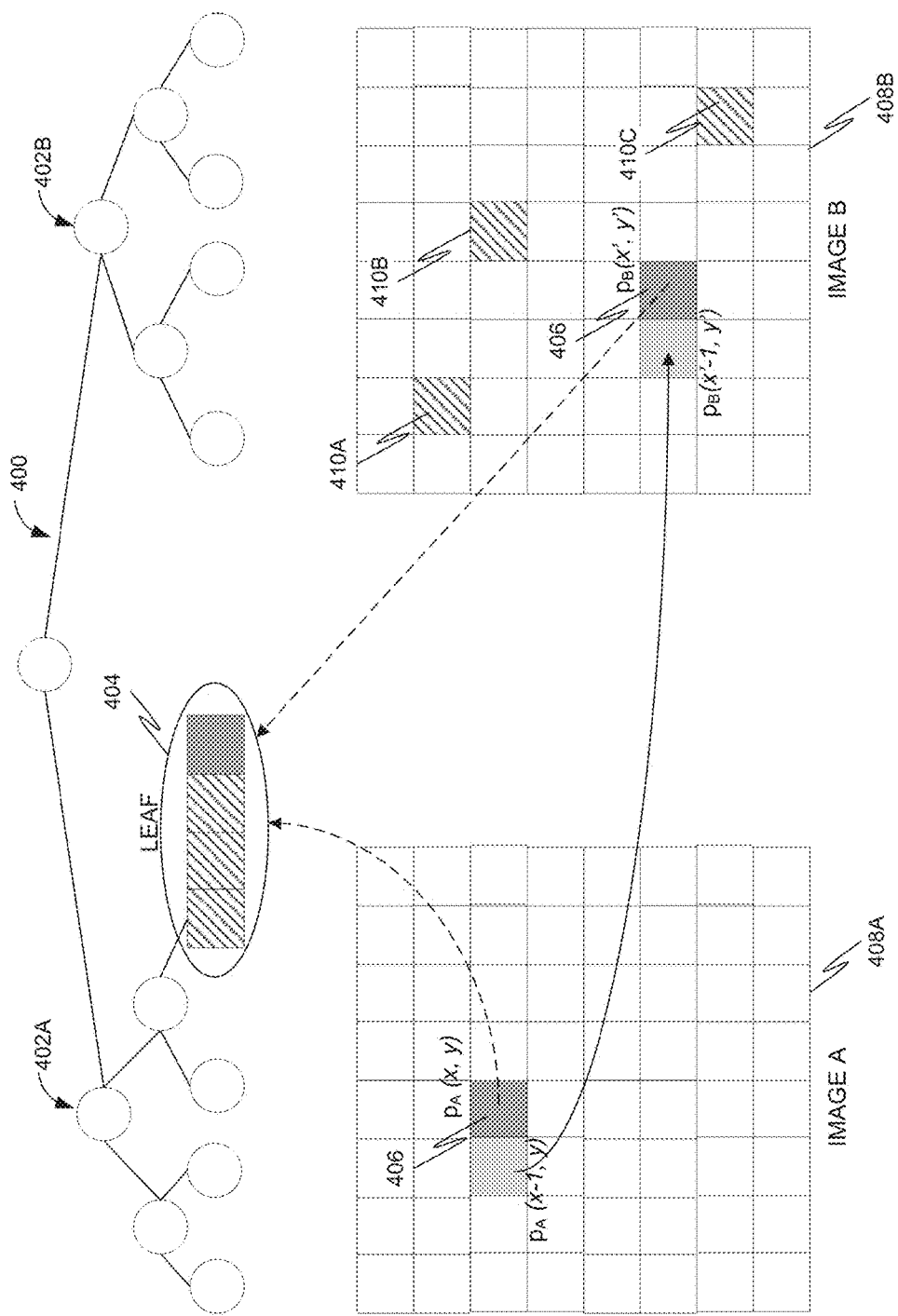
FIG. 4 is a diagram illustrating a K dimensional (KD)-tree, in accordance with an example embodiment.

After computing the Walsh-Hadamard Transform, a traditional KD-tree may be built. Given any candidate set, the dimension with a maximum spread may be selected, and the space may be split by the median value of the candidate data in this dimension. The candidate set is divided recursively until each terminal node (leaf) contains at most in candidates. A propagation-assisted KU-tree can be created using this same method. A search strategy for a propagation-assisted KD-tree is different than in a normal KD-tree. Specifically, this search strategy involves descending the tree to the appropriate leaf, propagating a leaf from the left (in the image) and a leaf from above (in the image), and then finding the nearest neighbor of all the candidate patches in these leaves. FIG. 4 is a diagram illustrating a KD-tree 400, in accordance with an example embodiment. The KD-tree includes a plurality of nodes, including, for example, nodes 402A and nodes 402B. Also included is at least one leaf, such as leaf 404. Region 406 in image A 408A is also present in image B 408B and represented as a propagated region into leaf 404. The candidates for this patch may also include regions 410A, 410B, and 410C.

In an example embodiment, for a given patch candidate in a reference frame of a video, a propagation-assisted KD-tree is constructed for a prior frame, and a propagation-assisted KD-tree is constructed for a subsequent frame. The propagation-assisted KD-tree search algorithm described above may then be performed on each of these two trees, and all of the candidates in either of these two trees will be considered patch candidates. These patch candidates can then be narrowed by applying the equation described above to eliminate candidates having a lack of temporal consistency (e.g., movement is inconsistent from frame to frame).

Figure 5:
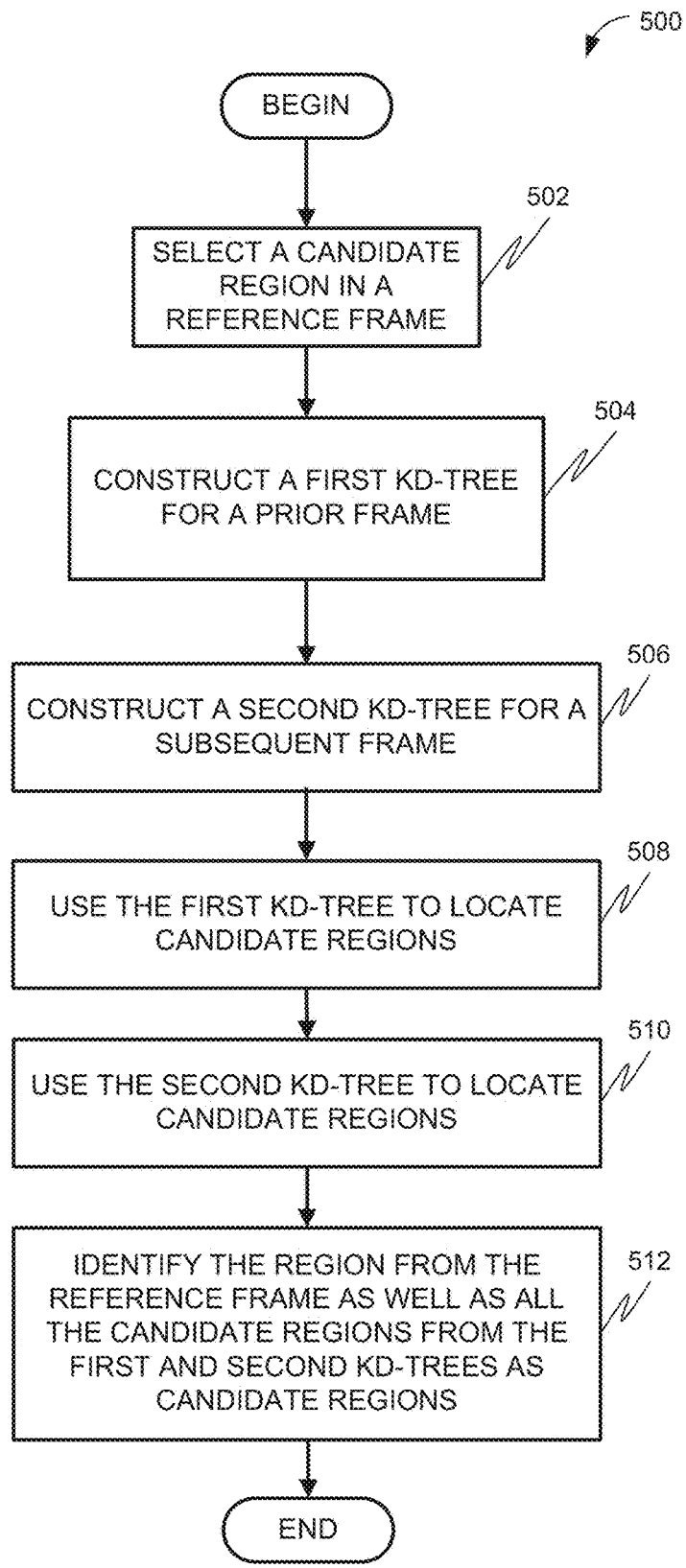
FIG. 5 is a flow diagram illustrating a method, in accordance with an example embodiment, of identifying candidate regions in a video having first, second, and third frames.

FIG. 5 is a flow diagram illustrating a method 500, in accordance with an example embodiment, of identifying candidate regions in a video having a prior, reference, and subsequent frame. At operation 502, a candidate region in the reference frame is selected. As described above, this may selected, for example, randomly, or by a user. At operation 504, a first KD-tree is constructed for the prior frame. At operation 506, a second KD-tree is constructed for the subsequent frame. At operation 508, the first KD-tree is searched to locate candidate regions. At operation 510, the second KD-tree is searched to locate candidate regions. At operation 512, the region from the reference frame, as well as the candidate regions from the first and second KD-trees, are identified as candidate regions.

As described above, the video enhancement process may be one of many different types of video enhancement processes. In one example embodiment, the video enhancement process is video denoising using optical flow.

Figure 6:
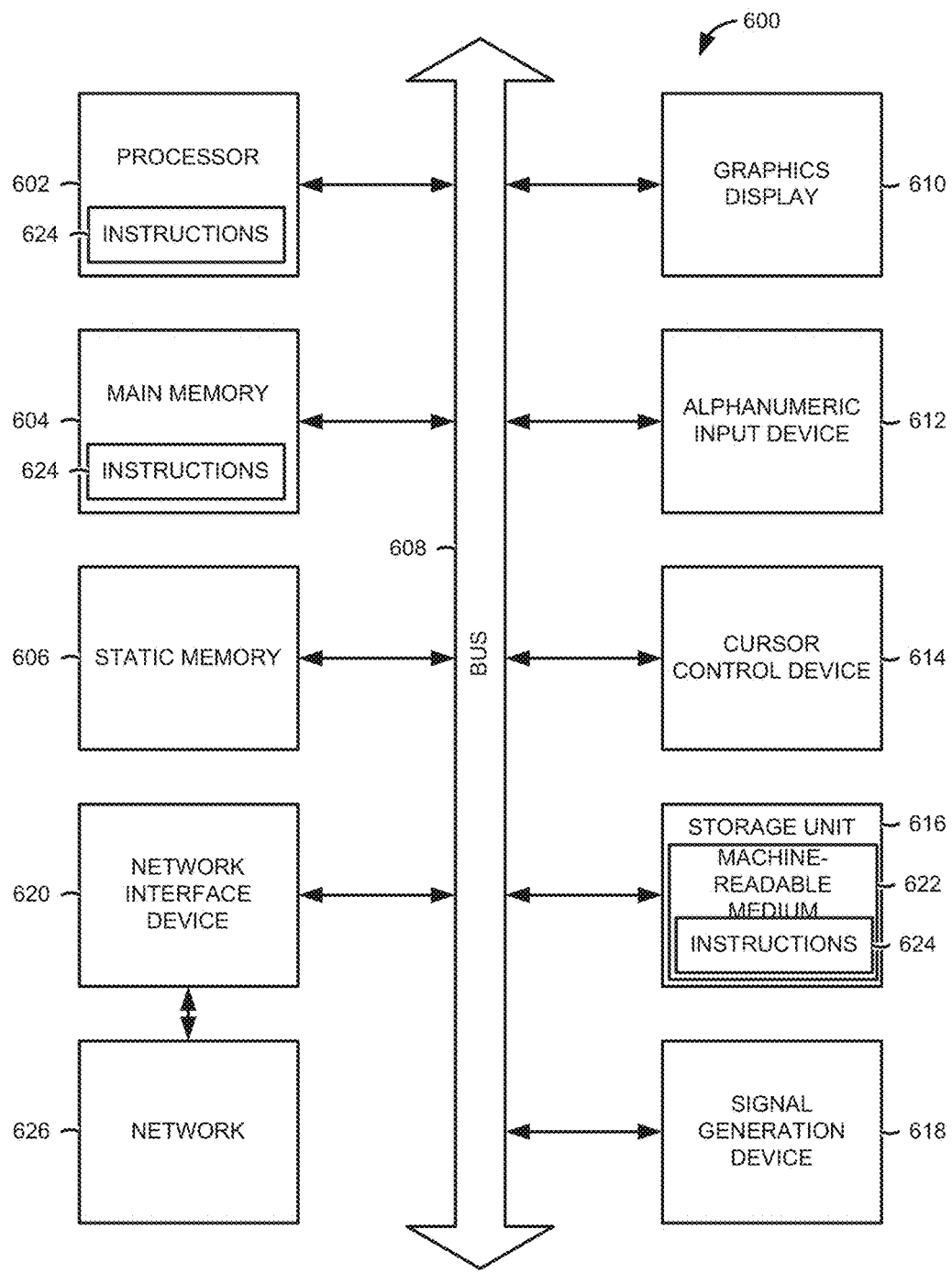
FIG. 6 is a block diagram of a computer processing system at a server system, within which a set of instructions may be executed for causing the computer to perform any one or more of the methodologies discussed herein.

FIG. 6 is a block diagram of a computer processing system 600 at a server system, within which a set of instructions may be executed for causing the computer to perform any one or more of the methodologies discussed herein.

Embodiments may also, for example, be deployed by Software-as-a-Service (SaaS), application service provider (ASP), or utility computing providers, in addition to being sold or licensed via traditional channels. The computer may be a server computer, a PC, a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 600 includes processor 602 (e.g., a central processing unit (CPU), a GPU or both), main memory 604 and static memory 606, which communicate with each other via bus 608. The processing system 600 may further include graphics display unit 610 (e.g., a plasma display, a liquid crystal display (LCD), or a cathode ray tube (CRT)). The processing system 600 also includes alphanumeric input device 612 (e.g., a keyboard), a cursor control device 614 (e.g., a mouse, touch screen, or the like), a storage unit 616, a signal generation device 618 (e.g., a speaker), and a network interface device 620.

The storage unit 616 includes machine-readable medium 622 on which is stored one or more sets of instructions 624 and data structures (e.g., software) embodying or utilized by any one or more of the methodologies or functions described herein. The instructions 624 may also reside, completely or at least partially, within the main memory 604 and/or within the processor 602 during execution thereof by the processing system 600, the main memory 604 and the processor 602 also constituting machine-readable, tangible media.

The instructions 624 may further be transmitted or received over network 626 via a network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions 624. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

What is claimed is:

1. A computerized method of identifying one or more patches in three or more frames in a video, the method comprising:
   detecting, by a processor, a region in a reference frame;
   identifying, by the processor, a set of regions in a prior frame and a subsequent frame that are similar to the region in the reference frame;
   determining, by the processor, temporal consistency between the region in the reference frame and two or more regions in the set of regions in the prior and subsequent frames, wherein the determining temporal consistency includes:
      determining a first relative change in position between the region in the reference frame and a first region in the prior frame, wherein the first relative change is a difference of a first direction and a first amount of movement between the region and the first region,
      determining a second relative change in position between the region in the reference frame and a second region in the subsequent frame, wherein the second relative change is a difference of a second direction and a second amount of movement between the region and the second region,
      and comparing the first relative change and the second relative change to determine temporal consistency,
         wherein a high degree of temporal consistency indicates that the region in the reference frame and the first region in the prior frame and the second region in the subsequent frame are indicative of a single region in the reference frame, the prior frame, and the subsequent frame, and
         wherein a low degree of temporal consistency indicates that the region in the reference frame and the set of regions in the prior frame and the subsequent frame are not indicative of the single region; and identifying, by the processor, patches of regions in the prior, reference, and subsequent frames based at least in part on the determined temporal consistencies.

2. The computerized method of claim 1, wherein the identifying a set of regions includes identifying a set of regions in the prior and subsequent frames and in another frame that are similar to the region in the reference frame, wherein the determining temporal consistency further includes determining temporal consistency between the region in the reference frame and three or more regions in the set of regions, wherein the identifying patches of regions includes identifying patches of regions in the prior, reference, subsequent, and another frames.

3. The computerized method of claim 1, wherein each frame of the video has an x/y axis and there are at least two location vectors indicating an amount and direction of movement of a region.

4. The computerized method of claim 3, wherein the identifying includes applying a weight to a location vector identifying the amount and direction of movement of a region between the prior frame and the subsequent frame.

5. The computerized method of claim 3, wherein the identifying includes applying a weight to alter an importance of closeness in distance between two patches selected from the prior frame and the reference frame or the reference frame and the subsequent frame.

6. The computerized method of claim 1, wherein the identifying patches of regions includes computing a first K-dimensional (KD)-tree for the prior frame and a second KU-tree for the subsequent frame and using patches identified in either the first KD-tree or the second KD-tree to determine candidates for patches of regions in the prior, reference, and subsequent frames.

7. The computerized method of claim 6, where a K-dimensional (KD)-tree is a binary tree where each node denotes a subset of candidate data with a portioning boundary of data space.

8. The computerized method of claim 1, further comprising:
performing video enhancement of the video utilizing the identified patches.

9. The computerized method of claim 8, wherein the video enhancement includes denoising.

10. The computerized method of claim 9, wherein the video enhancement includes deblurring.

11. The computerized method of claim 9, wherein the video enhancement includes recoloring.

12. The computerized method of claim 9, wherein the video enhancement includes compression removal.

13. The computerized method of claim 9, wherein the video enhancement includes inpainting.

14. An apparatus comprising:
a hardware processor;
a memory; and
a patch identification module configured to:
detect, using the hardware processor, a region in a reference frame of a video;
identify, using the hardware processor, a set of regions in a prior and subsequent frame of the video that are similar to the region in the reference frame;
determine, using the hardware processor, temporal consistency between the region in the reference frame and two or more regions in the set of regions in the prior and subsequent frames, wherein the determining temporal consistency includes:
determining a first relative change in position between the region in the reference frame and a first region in the prior frame, wherein the first relative change is a difference of a first direction and a first amount of movement between the region and the first region,
determining a second relative change in position between the region in the reference frame and a second region in the subsequent frame, wherein the second relative change is a difference of a second direction and a second amount of movement between the region and the second region, and
comparing the first relative change and the second relative change to determine temporal consistency,
wherein a high temporal consistency indicates a high extent of consistency of the first relative change and the second relative change, and
wherein a low temporal consistency indicates a low extent of consistency of the first relative change and the second relative change; and
identify, using the hardware processor, patches of regions in the prior, reference, and subsequent frames based at least in part on the determined temporal consistency.

15. The apparatus of claim 14, further comprising a video enhancement module configured to:
enhance, using the hardware processor, the video using the identified patches.

16. The apparatus of claim 14, wherein the memory stores a first KD-tree built for the prior frame and a second KD-tree built for the subsequent frame.

17. A non-transitory machine-readable storage medium comprising a set of instructions which, when executed by a processor, causes execution of operations comprising:
detecting a region in a reference frame of a video;
identifying a set of regions in a prior and subsequent frame that are similar to the region in the reference frame;
determining temporal consistency between the region in the reference frame and two or more regions in the set of regions in the prior and subsequent frames of the video, wherein the determining temporal consistency includes:
determining a first relative change in position between the region in the reference frame and a first region in the prior frame, wherein the first relative change is a difference of a first direction and a first amount of movement between the region and the first region,
determining a second relative change in position between the region in the reference frame and a second region in the subsequent frame, wherein the second relative change is a difference of a second direction and a second amount of movement between the region and the second region,
and comparing the first relative change and the second relative change to determine temporal consistency,
wherein a high temporal consistency indicates a high extent of consistency of the first relative change and the second relative change, and
wherein a low temporal consistency indicates a low extent of consistency of the first relative change and the second relative change; and
identifying patches of regions in the prior, reference, and subsequent frames based at least in part on the determined temporal consistency.

18. The non-transitory machine-readable storage medium of claim 17, wherein the identifying a set of regions includes identifying a set of regions in the prior and subsequent frames and in another frame that are similar to the region in the reference frame, wherein the calculating temporal consistency further includes calculating temporal consistency between the region in the reference frame and three or more regions in the set of regions, wherein the identifying patches of regions includes identifying patches of regions in the prior, reference, subsequent, and another frames.

* * * * *